United States Patent

[11] 3,590,269

[72] Inventor Rudolf Gebhardt
Heilbronn, Germany
[21] Appl. No. 825,144
[22] Filed May 16, 1969
[45] Patented June 29, 1971
[73] Assignee Telefunken Patentverwertungsgesellschaft m.b.H.
Ulm on der Donau, Germany
[32] Priority June 5, 1968
[33] Germany
[31] P 17 62 367.5

[54] PULSE GENERATOR
12 Claims, 2 Drawing Figs.

[52] U.S. Cl. .......... 307/106, 340/81
[51] Int. Cl. .......... H03k 3/00
[50] Field of Search .......... 307/132, 106; 340/72, 81; 331/108.3, 111; 315/77

[56] References Cited

UNITED STATES PATENTS

| | | | |
|---|---|---|---|
| 2,829,257 | 4/1958 | Root | 340/81 X |
| 2,977,581 | 3/1961 | Rodgers | 340/81 X |
| 3,018,473 | 1/1962 | Rodgers | 331/111 UX |
| 3,378,693 | 4/1968 | Schmidt | 307/132 |
| 3,478,248 | 11/1969 | Ivec | 340/81 X |

*Primary Examiner*—Robert K. Schaefer
*Assistant Examiner*—H. J. Hohauser
*Attorney*—Spencer & Kaye

ABSTRACT: The invention relates to a pulse generator suitable for use in flasher systems and comprising at least two transistors of opposite polarity having a common load, one transistor which carries the major portion of the load current being controlled by the other transistor, the control current bypassing the load.

PATENTED JUN 29 1971 3,590,269

Inventor:
Rudolf Gebhardt
By: Spencer & Kaye
Attorneys

PULSE GENERATOR

BACKGROUND OF THE INVENTION

The invention related to a pulse generator having at least two transistors of different polarity wherein currents from all the transistors flow through a load resistor.

Pulse generators of this kind which are also known from the literature under the name "Complementary trigger stages" generally consist of at least two transistors of different polarity which are coupled together in such a manner that, during operation, they are in the conducting or cutoff state simultaneously. In these circuits, the currents of all the transistors flow through a common resistor which, in the majority of cases, represents the load to be controlled by the generator at the same time.

In order to achieve a high-power output at the load resistor, an effort is generally made, with trigger circuits, to ensure that, if possible, the supply voltage appears in full at the load resistor in one pulse phase. It is precisely this, however, which is not fulfilled in the known constructions of complementary trigger stages. Instead, in these circuits, as a result of their construction, there is still a relatively high voltage at the driven transistors and this reduces the power delivered at the load resistor and leads to unnecessary heating of the transistors.

SUMMARY OF THE INVENTION

It is the object of the present invention to provide a pulse generator built up from at least two transistors of different polarity and a common load for these transistors, which does not have the disadvantage observed in known circuits.

According to the invention, there is provided a pulse generator comprising first and second transistors of different polarities, a first circuit including a load and the collector emitter paths of said first and second transistors, said first transistor taking the major proportion of the load current, and a second circuit controlling said first transistor and bypassing said load.

This can be achieved in an advantageous manner, for example, by the fact that at least the base-to-emitter path of the transistor carrying the major proportion of load current is connected to a voltage source through a circuit which does not include the common load resistor, and the flow of current through the base-to-emitter path of this first transistor is controlled by a second transistor.

The advantage of the pulse generator according to the invention consists in that, with it, the voltage appearing at the driven transistors is determined exclusively by the residual collector voltage of the transistor which takes the major proportion of the current flowing through the common load. When the transistors today available, which have low residual collector voltages, are used, this voltage is considerably lower than in known circuits in which said voltage consists of the sum of the base-to-emitter voltage of the transistor through which the load current flows, the residual collector voltage of a second transistor preceding this and at least one voltage appearing at the emitter resistor of this second transistor.

Because of the low voltage which appears at the driven transistors in the invention, a maximum power output at the load resistor and a minimum power dissipation in the transistors is ensured with this generator.

In detail, the pulse generator according to the invention may appropriately be constructed so that the second transistor is connected with its collector-to-emitter path in the circuit which does not include the common load. In this case, if the first and second transistors have different polarity, as is necessarily the case in circuits having two transistors, in contrast to circuits having more transistors, then this circuit, characterizing the invention, leads from one pole of a voltage source through a resistor to the emitter of the second transistor, from there through its emitter-to-collector path to the base of the first transistor and through its base-to-emitter path, as well as an impedance which may possibly be connected in series with this, to the second pole of the voltage source.

In the pulse generator according to the invention, it is immaterial in principle whether the base-to-emitter path of the first transistor is connected, through this circuit which does not include the common load, to the source of supply voltage itself or to a separate voltage source which only supplies the base current for the first transistor. In the pulse generator according to the invention, a capacitor may be provided as a voltage source for example, which capacitor receives a charge in one pulse phase and then surrenders it again, at least partially, to the first transistor, as a base current, during the following phase. In this embodiment of the invention, the size of this capacitor is selected such that the voltage appearing at the capacitor when the circuit is in operation never drops below a value which would lead to failure of this base current.

In another embodiment of the invention, the base current for the first transistor is derived from the general supply voltage of this generator. This then has the advantage that the capacitor described above, the capacitance value of which would have to be very high in some circumstances in generators having a very low pulse repetition frequency, can be dispensed with. In this modification of the pulse generator according to the invention, the emitter of the second transistor is connected to one pole of the source of supply voltage through a resistor. Whereas in a circuit in which the base current for the first transistor is derived from a separate voltage source, the common load may be connected, as desired, into either of the two current supply leads which connects the source of supply voltage to the transistors, in this embodiment of the invention it is connected in series with the emitter resistor of the second transistor and in parallel with the resistor which connects the emitter of this second transistor to the supply voltage.

BRIEF DESCRIPTION OF THE DRAWINGS

The invention will now be described in greater detail by way of example with reference to the accompanying drawings in which.

DESCRIPTION OF THE PREFERRED EMBODIMENTS

Figure 1:
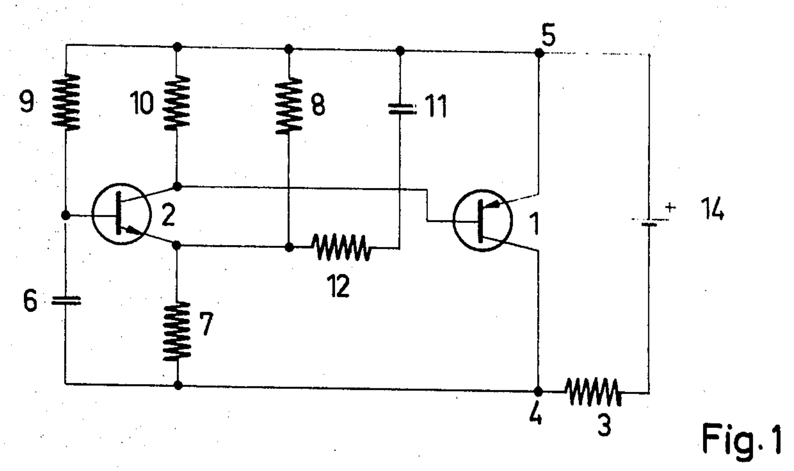
FIG. 1 is a circuit diagram of a first embodiment of the invention.
Figure 2:
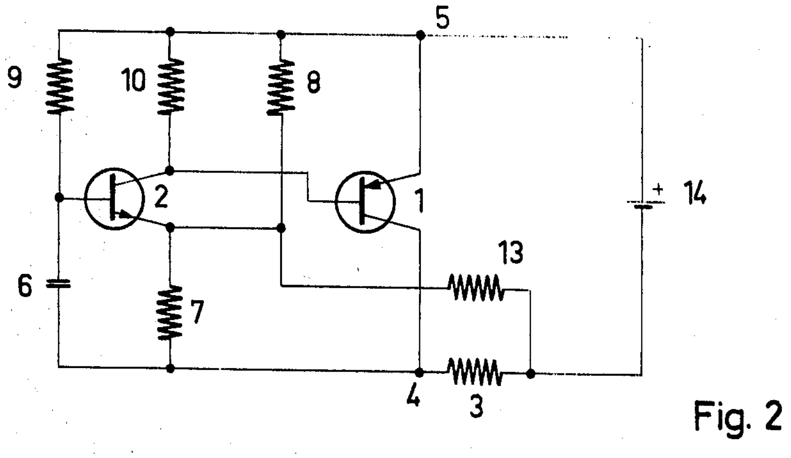
FIG. 2 is a circuit diagram of a second embodiment of the invention.

Referring to both FIGS. 1 and 2, each of the two circuits is composed of two transistors 1 and 2 of different polarity. The transistor 1, which takes the major proportion of the current flowing through the load 3 common to both transistors, is connected with its collector-to-emitter path directly between the two current supply conductors 4 and 5. In addition, in both circuits, the base-to-emitter path of the transistor 2 forms part of the discharge path of the capacitor 6 which determines the pulse duration and pulse repetition frequency and which is connected in parallel, by its terminals, with this base-to-emitter path and the emitter resistor 7 in series therewith. At the same time, the resistor 7 is a component of a voltage divider which it forms together with a resistor 8 and which is connected between the current supply conductors 4 and 5. The terminal of the capacitor 6 connected to the base of the transistor 2 is connected to the current supply conductor 5 through a resistor 9. In addition, in both circuits, the collector resistor 10 of the transistor 2 is connected in parallel with the base-to-emitter path of the transistor 1.

In contrast to known circuits, the transistor 1 receives its base current, in both examples through a circuit which does not include the load 3 connected into the current supply conductor 4. In the embodiment of the invention shown in FIG. 1, the capacitor 11, which is connected to the emitter of the transistor 2 by one terminal through the resistor 12 and to the current supply conductor 5 by its second terminal serves as a voltage source for the base current of the transistor 1. In the circuit illustrated in FIG. 2, this circuit, which characterizes the present invention, is realized by connecting the emitter of the transistor 2 directly to one pole of the source of supply voltage 14 through a resistor 13. In this embodiment of the invention, the base current of the transistor 1 flows from the positive pulse of the voltage source 14, through the base-to-emitter path of the transistor 1, the collector-to-emitter path of the transistor 2 and the resistor 13, to the other pole of this voltage source.

In order to explain the mode of operation of both circuits, it is first assumed that the capacitor 6 has no charge. As a result of the voltage appearing at the emitter resistor 7, the transistor 2 is cut off, and with it also the transistor 1. Only a negligibly low current now flows through the load 3, composed of the current through the voltage divider 7—8, the charging current of the capacitor 6 and the charging current of the capacitor 11 or the current flowing through the resistor 13. At this moment, therefore, substantially the full battery voltage lies between the current supply conductors 4 and 5. When, after a certain time, the capacitor 6 has become charged through the resistor 9 to such an extent that its voltage has reached a value which corresponds to the sum of the voltage appearing at the resistor 7 and the base-to-emitter threshold voltage of the transistor 2, then both transistors are rendered conducting. The voltage between the collector and emitter of the transistor 1 collapses except for a very low residual voltage. This state is maintained until the capacitor 6 has discharged and the base current of the transistor 2 has again become zero as a result. Since in the pulse generator according to the invention, as a result of its special construction, even with very low voltages at the collector-to-emitter path of the transistor 1, an adequate base current is still assured for this transistor and so the transistor 1 is always reliably driven into its saturation range, the values for this residual voltage are very low in contrast to known circuits.

As distinct from these forms of construction of the invention as shown in the FIGS. 1 and 2, circuits are, of course, also possible for the pulse generator according to the invention, which are composed of three or more transistors. The individual transistors may then be of any polarity provided only that at least two transistors are of different polarity. In all these circuits, however, at least the base-to-emitter path of the transistor which assumes the major proportion of the current flowing through the common load is connected, through a circuit which does not include this common load, to a voltage source which supplies the base current for this transistor. This does not exclude the possibility that, as well as the collector-to-emitter path of a transistor controlling the flow of current through this circuit, the emitter-to-base path or emitter-to-collector path of at least one further transistor may also be included in this circuit.

The pulse generator according to the invention has proved particularly satisfactory for use in battery-operated blinker systems such as are used, for example, on the roads to distinguish possible sources of danger. One or more lamps may then form the load through which the current of all the transistors flow for example. Because of the very low residual voltages remaining at the driven transistors, this generator ensures a maximum of light power delivered for a given battery voltage and for a maximum permissible current determined by the transistors.

What I claim as new and desire to secure by Letters Patent of the United States is:

1. A pulse generator comprising first and second transistors of different polarities, a first circuit including a load and the collector-emitter paths of said first and second transistors, said first transistor taking the major proportion of the load current, and a second circuit means for supplying base current to said first transistor and bypassing said load.

2. A pulse generator as claimed in claim 1, wherein said second circuit includes a voltage source connected to the base-emitter path of said first transistor and the current from said voltage source is controlled by said second transistor.

3. A pulse generator as claimed in claim 2, wherein, the collector-emitter path of said second transistor is connected into said second circuit.

4. A pulse generator as claimed in claim 3, wherein said second circuit included first connecting means for connecting the emitter of said second transistor to a first pole of said voltage source, a series-connected resistor in said first connecting means and second connecting means for connecting a second pole of said voltage source to the emitter of said first transistor.

5. A pulse generator as claimed in claim 4, wherein said voltage source is a capacitor.

6 A pulse generator as claimed in claim 4, further comprising third connecting means for connecting the emitter of said second transistor to one pole of a voltage source supplying the generator, a series-connected resistor in said third connecting means an emitter resistor for said second transistor and fourth connecting means for connecting the said load in series with said emitter resistor and in parallel with said resistor in said third connecting means.

7. In a pulse generator having at least two transistors of different plurality and a common load resistor through which current from all of said transistors flows and wherein a first of said transistors assumes the major proportion of the load current, the improvement comprising circuit means for supplying the base current to said first transistor which does not include said common load resistor.

8. A pulse generator as defined in claim 7, wherein within said circuit means at least the base-to-emitter path of said transistor which assumes the major proportion of load current is connected to a voltage source through a circuit connection which does not include said common load resistor; and wherein the flow of current through said base-to-emitter path of said first transistor is controlled by a second transistor.

9. A pulse generator as defined in claim 8, wherein the collector-to-emitter path of said second transistor is connected into said circuit means which does not include the common load.

10. A pulse generator as defined in claim 9, wherein said first and second transistors are of different polarity and wherein within said circuit means which does not include said common load resistor, to one pole of a voltage source which supplies the base current for said first transistor and the second pole of the voltage source is connected directly, or through an impedance, to the emitter of the first transistor.

11. A pulse generator as defined in claim 10, wherein the voltage source for the base current of said first transistor is formed by a capacitor.

12. A pulse generator as defined in claim 10, wherein the emitter of said second transistor is connected via a resistor to one pole of the voltage source supplying said pulse generator and that said common load resistor is connected, in series with an emitter resistor of said second transistor, in parallel with said resistor.